Feb. 8, 1938.  K. BLASIG  2,107,976
MEASURING AND INDICATING APPARATUS
Filed Sept. 24, 1936
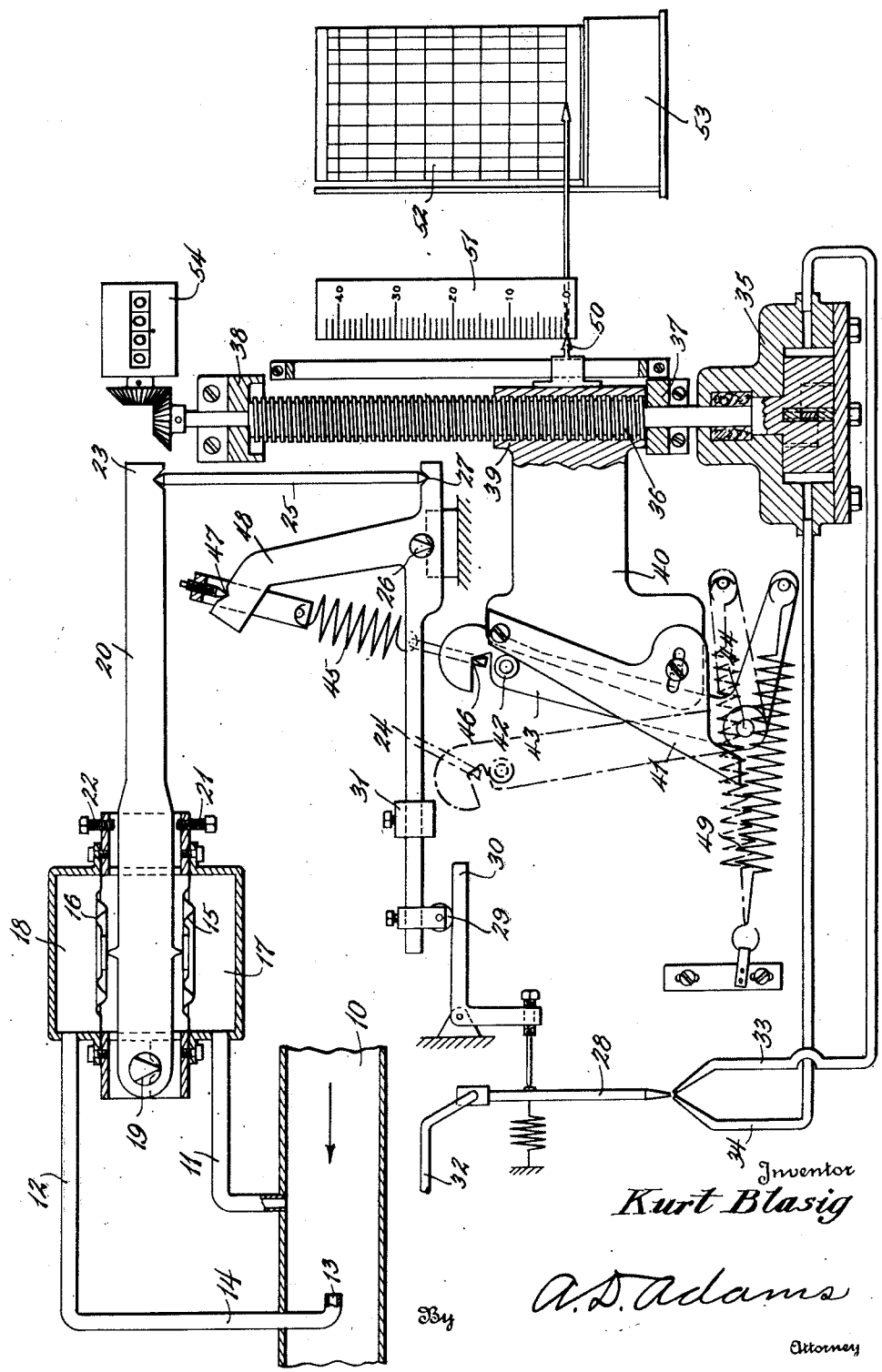
Inventor
Kurt Blasig
By A. D. Adams
Attorney Patented Feb. 8, 1938

2,107,976

UNITED STATES PATENT OFFICE 2,107,976

MEASURING AND INDICATING APPARATUS

Kurt Blasig, Berlin-Steglitz, Germany, assignor to Askania-Werke A. G. vormals Centralwerkstatt-Dessau und Carl Bamberg-Friedenau, a corporation of Germany Application September 24, 1936, Serial No. 102,426 In Germany September 25, 1935

7 Claims. (Cl. 73—205)

This invention relates to measuring apparatus and, among other objects, aims to provide an improved, simplified, sensitive rugged device, especially designed for use in measuring the flow of fluids in a conduit or the speed of a moving craft relative to the surrounding fluid. One of the principal aims is to provide apparatus employing a sensitive relay, such as the well known Askania jet pipe to control the operation of an indicating mechanism and means actuated by a motor to produce straight line movements which are directly proportional to the flow of fluid or the relative speed of the craft, as the case may be.

Other aims and advantages will appear in the specification when considered in connection with the accompanying drawing, wherein The figure is a diagrammatic view partly in elevation disclosing one form of instrument embodying the invention.

Referring particularly to the drawing, the embodiment of the invention therein shown is especially designed for measuring the rate of flow of fluids or the speed of craft and indicating the measurements on a linear scale and/or recording them on a right line chart. The measurements are taken by creating differential fluid pressures which are a parabolic function of the rate of flow of the fluid.

In this instance, the fluid flowing through a conduit 10 sets up a differential pressure in a pair of pipes 11 and 12, the former transmitting the static pressure of the fluid and the latter the dynamic pressure set up in the opening 13 of a Pitot tube 14 exposed to the flowing fluid. The differential pressure acts on a differential pressure responsive device, shown as including a pair of oppositely disposed diaphragms 15 and 16 in diaphragm chambers 17 and 18, respectively, which are rigidly supported in spaced relation to accommodate the pivoted end 19 of a force transmitting lever 20. The diaphragms act in opposition to each other on the lever at a distance from the pivot bearings. Adjustable stops 21 and 22 are provided to prevent excessive movement of the lever. The free end 23 of the lever is shown as acting on a counterlever 24 by means of a suitable link or pin 25. The counterlever is pivoted at 26 near the pin bearing 27 and is arranged to control an Askania jet pipe relay 28. The outer end of the lever is shown as having an adjustably mounted roller 29 which acts on a control arm 30 to impart movement to the jet pipe in one direction. The lever system is adapted to be counterbalanced by an adjustable weight 31 on the counterlever.

The jet pipe relay is supplied with pressure fluid from a suitable source (not shown) through a conduit 32. The jet pipe delivers pressure fluid into one or the other of a pair of conduits 33, 34 to operate a reversible fluid motor 35 shown as being of the rotary type.

The motor is shown as connected to rotate a screw threaded shaft 36 mounted in bearings 37, 38. The shaft carries a non-rotatable nut 39 on which is mounted a bracket 40 carrying a cam 41. The pitch of the cam can be altered by means of an adjustable mounting of the cam with respect to the bracket, a pivot and slot and screw connection between the cam and bracket being shown for this purpose. The cam 41 bears against a pin 42 on a bell crank lever 43 pivotally mounted at 44. An expansion spring 45 is shown as being secured in knife edge bearings 46, 47 to the lever 43 and an arm 48 of the counterlever 24 to exert a counter-balancing force on the counterlever. Upon rotation of the motor 35 in a direction to move the nut 39 upwardly, the cam 41 will turn the lever 43 in a counterclockwise direction and thereby increase the force exerted by the spring between the levers 43 and 24 by expanding the same.

To insure a substantially constant contact pressure between the pin 42 on the bell crank and the cam-face and thereby a constant load on the threaded shaft a spring 49 is shown as connected to the free arm of the bell crank. In the position shown, the axis of the spring 49 lies below the pivot 44. The arrangement is such that the spring 49 initially tends to turn the bell crank clockwise, thereby assisting the spring 45, which is only slightly expanded, in keeping the pin 42 in contact with the cam. Upon relatively large displacement of the nut, and the resulting increased force exerted by the spring 45, the free arm of the bell crank will turn counterclockwise so that the spring 49 will then tend to relieve the pressure exerted by the pin 42 on the cam 41. The latter position is indicated in the drawing in dash-dot lines, the axis of spring 49 being above the pivot 44.

The leverage and the pitch of the cam are such that the counterbalancing force exerted on the force transmitting lever is always proportional to the square of the displacement of the nut. Conversely, the displacement of the nut is directly proportional to the rate of flow or speed. Therefore, the nut may be equipped with a pointer 50 cooperating with the linear scale 51 calibrated to read in terms of rate of flow or speed according to the position of the nut. The position of the nut may be permanently recorded on a right line chart 52 without distortion. The chart is rotated by the usual clockwork in a casing 53. The shaft also operates a speed indicator 54 which accurately registers in numerals the speed. The indicator 54 is operated according to the number of revolutions of the shaft with respect to the zero position of the nut, thus obviating the necessity of interpolating the pointer indication.

The operation of the device is as follows: Upon an increase of speed or change in rate of flow of the fluid in conduit 10 the differential pressure will move the force transmitting lever 20 downwardly, thereby imparting clockwise movement to the counter-lever 24 against the tension of the spring 45. The jet pipe swings to the right and discharges into conduit 33, thereby rotating the motor 35 in such direction as to impart an upward movement to the nut 39. As the nut moves upwardly, carrying the cam 41 with it, the cam face increases the tension of the spring 45 by displacing the bell crank 43 in a counterclockwise direction. The increased spring tension will restore the lever system to a state of equilibrium and thereby return the jet pipe to its neutral position. The motor will stop and remain idle as long as there is no further change in the rate of flow or speed. The indicator, the registering counter and the recorder will show the correct rate of flow or speed with great accuracy.

From the foregoing description it will be seen that the improved apparatus is relatively simple, rugged, and reliable in operation. The mechanism is free from "hunting" or "overshooting the mark" as there is practically no inertia of the moving parts and as the jet pipe relay will instantly stop the motor when the equilibrium of the lever system is established.

Obviously, the present invention is not restricted to the particular embodiment thereof herein shown and described, moreover, it is not indispensable that all the features of the invention be used conjointly, since they may be employed advantageously in various combinations and sub-combinations.

What is claimed is:

1. Measuring apparatus of the character described comprising, in combination, a differential pressure responsive device creating a controlling force; a relay connected to be operated by said controlling force; a reversible motor controlled by said relay; a threaded shaft turned by said motor; a nut movable on said shaft without turning; a cam associated with and moved by said nut; a lever arranged to be displaced by the movement of said cam; a spring connected to said lever and arranged to counteract said controlling force; and indicator means for indicating the relative position of said nut and said spindle.

2. Measuring apparatus of the character described comprising, in combination, a differential pressure responsive device creating a controlling force; pressure fluid means including a relay connected to be operated by said controlling force; a reversible pressure fluid motor controlled by said relay; a screw-threaded shaft turned by said motor; a nut movable on said shaft without turning; a cam associated with and moved by said nut; a lever arranged to be displaced by the movement of said cam; a spring connected to said lever and arranged to counteract said controlling force; and indicator means for indicating the relative position of said nut and said spindle.

3. An instrument for measuring the rate of flow of fluid comprising, in combination, means to create a differential pressure which is a function of the rate of flow; a differential pressure responsive device creating a controlling force; pressure fluid means including a relay connected to be operated by said controlling force; a reversible pressure fluid motor controlled by said relay; a threaded shaft turned by said motor; a nut movable on said shaft without turning; a cam connected to be actuated by said nut; a lever arranged to be displaced by the movement of said cam; a spring connected to said lever and arranged to counteract said controlling force; and indicator means for indicating the relative position of said nut and said spindle, to determine the rate of flow.

4. An instrument for measuring the rate of flow of fluid comprising, in combination, means to create a differential pressure which is a function of the rate of flow; a differential pressure responsive device creating a controlling force; pressure fluid means including a relay connected to be operated by said controlling force; a reversible pressure fluid motor controlled by said relay; a threaded spindle turned by said motor; a nut movable on said spindle without turning; a cam; means for adjustably mounting said cam on said nut; a lever arranged to be displaced by the movement of said cam; a spring connected to said lever and arranged to counteract said controlling force; and indicator means for indicating the relative position of said nut and said spindle, to determine the rate of flow.

5. An instrument for measuring the rate of flow of fluid comprising, in combination, means to create a differential pressure which is a function of the rate of flow; a differential pressure responsive device creating a controlling force; pressure fluid means including a relay connected to be operated by said controlling force; a reversible pressure fluid motor controlled by said relay; a threaded shaft turned by said motor; a nut movable on said shaft without turning; a cam carried by and adjustably mounted with respect to said nut; a lever arranged to be displaced by the movement of said cam; a spring connected to said lever and arranged to counteract said controlling force; a second spring connected to said lever tending to press the lever against said cam upon small displacements of the nut from the zero position and tending to lift the same from the cam upon large displacements; and indicator means for indicating the relative position of said nut and said spindle.

6. An instrument for measuring the rate of flow of fluid comprising, in combination, means to create a differential pressure which is a function of the rate of flow; a differential pressure responsive device creating a controlling force; a relay connected to be operated by said controlling force; a reversible motor controlled by said relay; a threaded spindle turned by said motor; a nut movable on said spindle without turning; a cam associated with and moved by said nut; a lever arranged to be displaced by the movement of said cam; a spring connected to said lever and arranged to counteract said controlling force; and an indicator connected to be operated by the revolutions of said spindle for indicating in numerals the rate of flow.

7. A measuring apparatus of the character described comprising, in combination, a differential pressure responsive device creating a controlling force; a relay connected to be operated by said controlling force; a reversible motor controlled by said relay; a threaded shaft turned by said motor; a nut movable on said shaft without turning; a cam associated with and moved by said nut; a lever arranged to be displaced by the movement of said cam; a spring connected to said lever and arranged to counteract said controlling force; and means including a right line chart for recording the relative position of said nut and said spindle.

KURT BLASIG.